United States Patent Office 3,283,598
Patented Nov. 8, 1966

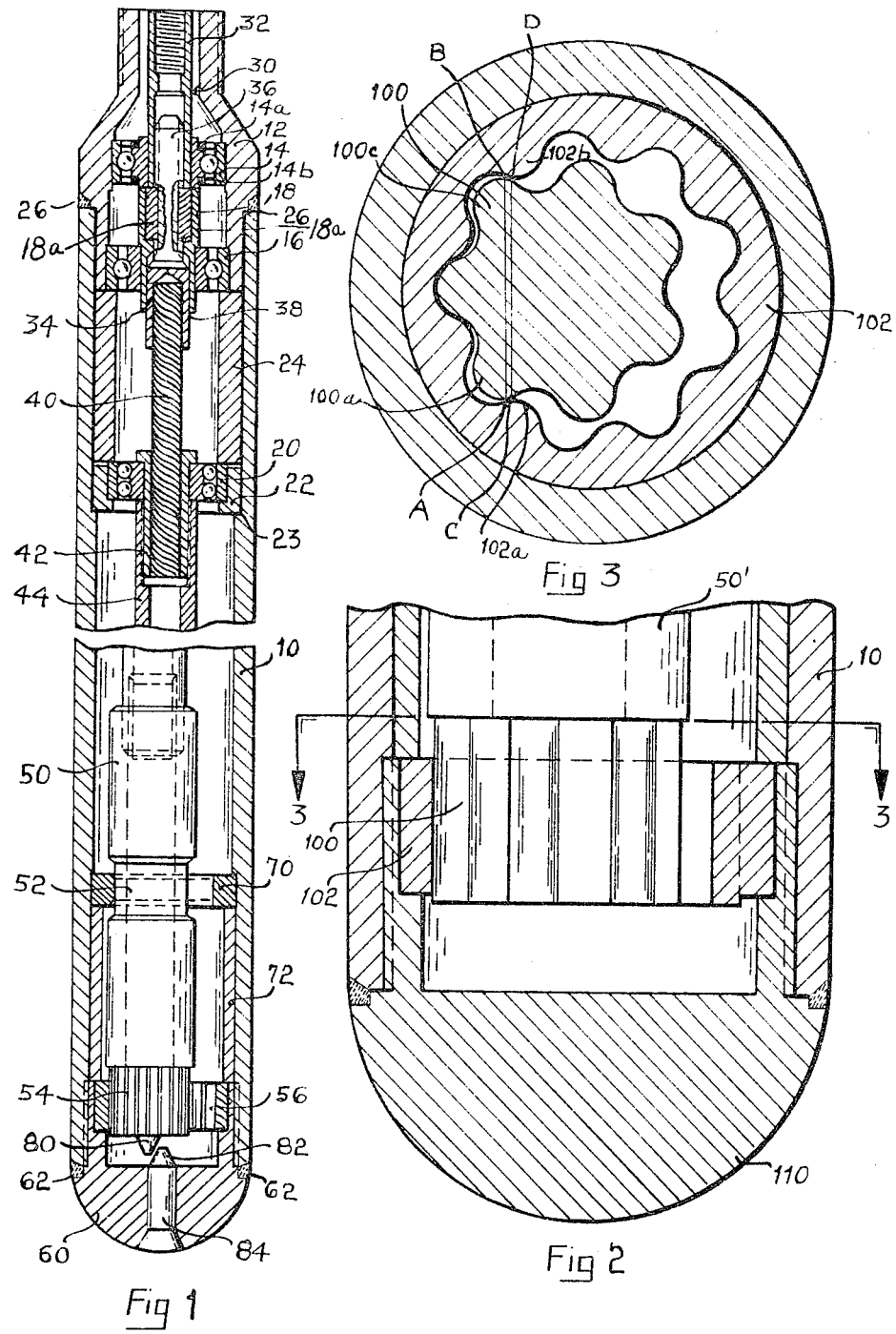

3,283,598
VIBRATOR
Ralph Glenn Barnes, 4361 Wallington Drive,
Dayton, Ohio
Filed Aug. 26, 1963, Ser. No. 304,604
7 Claims. (Cl. 74—87)

This invention relates to a vibrator and more particularly to a vibrator used in compacting concrete, although not necessarily so limited. The present application is a continuation-in-part of my copending application Serial No. 53,513 filed September 1, 1960.

It has been found that by subjecting concrete to vibrations immediately after it is poured into the forms, the concrete is compacted and a stronger product is produced. The higher the frequency, the more effective the vibrations are. Thus, in the present invention, vibratory forces are created by rotating the center of gravity of a rotor around the axis of a containing cylinder. The centrifugal forces created to produce the effective vibrating forces increase in direct proportion to any increase in either the radius of rotation or in the weight of the rotor being rotated, but will increase in proportion to the squares of the vibratory frequency. Therefore, the use of high frequencies provides the required vibrating forces with less weight and bulk in the vibrating unit.

When using direct drives for vibrators, high frequencies, as 14,000 to 15,000 vibrations per minute, result in rapid failure of the bearings of the driving motor and the bearings supporting the rotor shaft. That being the case, it is an object of the present invention to provide a device for amplifying the input frequency of the motor. This has been accomplished in the present case by the use of a gear mechanism that regulates rotation of the rotor or roller within a casing through an eccentric path several times faster than the speed of the motor.

Another object of this invention is to provide a positive amplifier for the speed of the motor. This has been accomplished by using an internally toothed ring gear having mounted therein a planetary gear of a lesser diameter, so that as the eccentric roller is driven from the prime mover or the driving motor, the roller rotates within the housing at a speed which is regulated by the ring and planetary gears and which is higher than the speed of the motor.

Another object of this invention is to provide a ring gear having mounted therein a planetary gear that is so designed that it cannot move out of mesh with the ring gear when the planetary gear is driven. This has been accomplished by selecting such gear ratios and design of gear teeth that the maximum distance of the outer surfaces of the teeth of the planetary gear is greater than the minimum distance between the contacting teeth of the ring gear, so that the planetary gear when in mesh cannot be moved out of mesh.

Still another object of this invention is to provide, for an orbiting roller or weight in a rotary vibrator, surface means upon which the roller rolls freely as it orbits and against which the centrifugal force of the roller is applied, and regulatory means for initiating and sustaining the free rolling movement of said roller.

A further object of this invention is the provision of a new and improved means to support and transmit power to the orbiting roller or weight of a vibrator device.

Still a further object of this invention is to provide a new and improved method for grinding a cylindrical surface to a prescribed diameter and, more specifically for establishing a substantially perfect rolling fit for a roller operating in a regulated orbit in a vibrator device.

Other objects and advantages reside in the construction of parts, the combination thereof, the method of manufacture and the mode of operation, as will become more apparent from the following description.

In the drawings, FIGURE 1 is a longitudinal sectional view of the housing for a vibrator showing the vibrating element.

FIGURE 2 is an enlarged fragmentary view of a modification of the lower end of the vibrator and, more specifically, of a modification in regulatory gears used in the vibrator.

FIGURE 3 is a cross sectional view, taken substantially on the line 3—3 of FIGURE 2.

Referring to the drawings, the tubular member 10 forms the main part of the housing. A capping member 12, having a tapered portion, supports a pair of bearings 14 and 16 held in spaced relation by a spacer 18 integral with a sleeve 32. The first bearing 14 is provided with a double seal 14a and 14b which prevents entry of grit and grease to the bearing, especially when the vibrator is driven with a flexible shaft, while, at the same time, retaining the lubrication already in the bearing. A third and self-aligning bearing 20 is seated in a bearing cage 22. This bearing 20 allows swinging action of the parts journalled therein as long as the swinging action is not too great. The bearing cage 22 abuts a shoulder in the housing 10. A spacer 24 snugly seated in the housing is positioned between the bearing 16 and 20. A capping member 12 may be press-fitted or it may be provided with threads engaging internal threads in the end of the housing 10. As the capping member 12 is pressed or threaded into position, a shoulder 17 in the inner end thereof engages the upper end of the outer race of the bearing 16 and presses same against the spacer 24. This presses the spacer axially against the outer race of the bearing 20 which, in turn, presses the cage 22 against a shoulder 23 in the interior of the housing 10. As a consequence, the bearings 16 and 20 are firmly held in position. Upon completion of the foregoing assembly, the capping member 12 is welded to the housing 10 at 26.

The bearings 14 and 16 support a tubular drive shaft assembly 30. This assembly consists of a tubular portion 32 integral with the enlarged tubular portion 18 and a tubular portion 34. The enlarged portion 18 has mounted therein a pair of keys 18a. These keys project inwardly and cooperate with a grooved portion 36, so as to form a splined coupling between the shaft assembly 30 and a coupling member 38 having seated in the end thereof and fixedly secured thereto a flexible shaft 40. This splined connection formed by the enlarged portion 18, the keys 18a and the portion 36, permits swinging movement of the flexible cable 40 and the parts carried thereby without a binding action upon the shaft assembly 30. It can readily be seen that as the flexible cable 40 swings so that the parts carried thereby travel through an eccentric path, the flexible cable lowers the upper portion 36. This splined connection permits axial movement or longitudinal movement between the drive shaft assembly 30 and the flexible cable 40. The opposite end of the flexible shaft or cable has fixedly attached thereto a tubular sleeve 42 threadedly attached to a tubular shaft 44 secured to a cylindrical roller 50. This roller 50 is provided with an annular groove 52 near the center of the pendulum member.

A pinion or gear 54 integral with or fixedly attached to the lower end of the roller 50 meshes with a ring gear 56 fixedly mounted in a capping member 60 threadedly engaging the lower end of the housing 10 and permanently secured in position by welds 62.

A bearing ring 70 is press-fitted in the housing 10 and registers with the annular groove 52 in the roller 50. The ring 70 is held in spaced relation from the ring gear 56 by a spacer 72. The threaded capping member 60, pressing against the bearing ring 70 through the medium of the spacer 72, cooperates with the wall of the housing 10 to frictionally secure the bearing ring against rotation with respect to the housing 10. A frustum-conical projection 80 projects from the lower end of the gear. This frustum-conical projection cooperates with a frustum-conical end or projection 82 of member 84 fixedly secured to the capping member 60. The frustum-conical end 82 is aligned with the longitudinal axis of the tubular housing 10. The projection 80 is aligned with the axis of rotation of the roller 50. The two frustum-conical projections cooperate to hold the gear teeth of the gear 54 in mesh with the internal teeth of the ring gear 56. The depth of the teeth in the gears 54 and 56 is sufficient to permit the surface of the groove 52 to contact the interior surface of the ring 70 before the teeth of the gears 54 and 56 bottom into the valleys therebetween.

The shaft assembly 30 is driven from an electric motor, not shown, the armature shaft of which may be attached directly to the upper end of the shaft assembly 30, or it may be remotely located and connected to the shaft assembly 30 by a suitable drive shaft that may be flexible, either by the use of universal joints, or by the use of a flexible shaft.

It can readily be seen that, upon rotation of the drive assembly 30 the projections 80 and 82 will cause the roller 50 to rotate in an eccentric orbit. More specifically, the projections 80 and 82 will force the gears 54 and 56 to engage, whereby the teeth of the pinion 54 will react against the teeth of the ring gear 56 and cause the center of mass of the roller to orbit about the projection 82 in a direction opposite to the direction of spin rotation impressed on the roller.

The centrifugal force attributable to this orbital rotation causes the roller to press against and roll upon the ring 70. Clearly, if the ratio of the interior diameter of the ring 70 to the diameter of the groove 52 exactly equals the ratio of the number of teeth in the ring gear 56 to the number of teeth in the pinion 54, the roller 50 will roll without slipping on the interior wall of the ring 70. More importantly, if the foregoing ratios are accurately equalized, it is clear that the outer periphery of the groove 52 will tractionally engage with the inner periphery of the ring 70, such that once the gears 54 and 56 have established orbital rotation of the roller, the pendulum will react directly against the ring 70, relieving all torque on the ring gear 56. As is customary in gear construction, the teeth of the pinion 54 have circumferential play or rotational lost motion between the teeth of the gears 56. When the roller rolls accurately on the bearing ring 70, the gear teeth do not touch except to initiate orbital rotation and occasionally correct such rotation, as hereinafter described.

If the ring 70 is too large in diameter with respect to the diameter of the groove 52, the roller 50 cannot roll tractionally in the ring 70 at a great enough orbital velocity to relieve the torque on the gear teeth. More specifically, the teeth in the gears 54 and 56 will force the roller to orbit at a greater speed than that at which the roller can roll in the ring 70 without slipping. The result will be a forced slippage between the roller 50 and the interior wall of the ring 70, with consequent frictional wear between the surface of the groove 52 and the interior surface of the ring 70. Such frictional wear magnifies the misfit between the groove 52 and the ring 70, with the result that the frictional wear rapidly becomes excessive, such that the gear teeth ultimately bottom into the valleys therebetween and the benefit derived from the ring 70 is lost.

This ultimate consequence can be avoided, or at least substantially delayed, if proper precautions are taken in the construction of the present vibrator. Thus, it is found that a true rolling condition can be established automatically between the groove 52 and the ring 70 by intentionally making the ring 70 undersized (or the groove 52 oversized, or both) at the time the vibrator is first assembled. Then, when the vibrator is first operated, the gears 54 and 56 force an orbital angular velocity of the roller relative to the ring 70, which is less than the angular velocity at which the roller will roll without slippage in the ring 70. The result is a frictional wear between the groove 52 and the interior surface of the ring 70 which will automatically adjust the diameters of these cylindrical surfaces to the point where they roll almost perfectly at the orbital velocity required by the gears 54 and 56.

This near perfect rolling condition is very quickly established in the early hours of vibrator operation. Once the rolling condition is established, frictional wear becomes negligible. A perfect rolling fit obviously cannot be maintained as a practical matter. However, as the wear between the surface of the groove 52 and the ring 70 approaches a point of perfection, the gears 54 and 56 touch only occasionally to adjust the orbital velocity of the rolling roller to that required by the tooth ratio in these gears.

Even after frictional wear has finally adjusted the relative diameters of the groove 52 and the ring 70 beyond the point of substantial perfection, the teeth in the gears 54 and 56 continue to touch only occasionally to adjust the orbital velocity of the rolling roller. Only after frictional wear has progressed to the point that continuous slippage of the roller in the ring 70 is unavoidable does rapid frictional wear in the vibrator set in. Accordingly, a prolonged operating life under conditions of negligible friction is possible with the present vibrator design.

It will be recognized, of course, that each time rotation of the roller is stopped, then started anew, there will be a torque applied to the ring gear 56. However, the roller quickly reaches its rolling orbital velocity, with the result that traction between the roller and the ring 70 becomes the substantial driving force and torsional loading on the gear teeth becomes negligible. Thus, during periods when the vibrator is properly adjusted, and this constitutes almost the entire operating life of the vibrator, the gears function essentially to start the vibrator from an idle condition and thereafter only function periodically to adjust a minor misfit between the rolling orbital velocity of the roller and the orbital velocity required by the gears.

The desired condition wherein the roller grinds to a fit with the ring bearing is established with any positive orbital drive, such as that provided by the gears 54 and 56, whenever the product of $d/D-d$ times the spin velocity imparted to the roller exceeds the orbital velocity impressed on the roller, $D$ being the internal diameter of the bearing ring and $d$ being the external diameter of the roller groove 52.

Due to the orbiting condition established, the center of mass of roller member 50 travels through its eccentric path or orbit at a much higher speed than the speed of rotation of the shaft assembly 30. If, for example, the ring gear 56 has 9 teeth and the pinion 54 has 7 teeth, the ratio of the orbital output speed of the gear 54 to the impressed spin velocity is three and one-half to one. That is, the orbital velocity is equal to $n/N-n$ times the spin velocity, where $n$ is the number of teeth in the pinion and $N$ is the number of teeth in the ring gear. If the shaft assembly 30 is rotated at 4000 r.p.m., the orbital speed of the center of mass of the roller will be on the order of 14,000 r.p.m. In other words, the present design amplifies the input frequency, so that the output frequency of the vibrations caused by the roller 50 is much higher than that of the input frequency. By the use of gears 54 and 56, a fixed magnitude of amplification is thereby obtained.

In the modification disclosed in FIGURES 2 and 3, only the lower end of the tubular housing 10 has been shown. The roller 50 may be identical to the one disclosed in FIGURE 1. The pinion 100 and the ring gear 102 have such a gear ratio and such a design of teeth or cogs that, when the gears are once in mesh, they cannot get out of mesh. This has been accomplished by selecting gear ratios and design of teeth such that the maximum distance between the closest surfaces of alternate teeth of the pinion 100 is greater than the minimum distance between alternate teeth of the ring gear 102. That is, the distance A–B, representing minimum separation between the alternate teeth 100a and 100c of the pinion 100 is slightly greater than the distance C–D, the minimum separation between the meshing teeth 102a and 102b of the ring gear 102. When the gear ratios and and the gear teeth are so designed that the gears cannot get out of mesh, the frustum-conical projections 80 and 82 may be omitted, so as to have a capping member 110 that does not have any projection corresponding to the projection 82, and the roller 50 is not provided with a projection corresponding to the projection 80.

In the design of the present vibrator, the ring 70 is deliberately located below the center of the housing 10. Further, the masses of the shaft 44 and the pinion 54 are balanced, so that the center of mass or center of impact for the entire roller assembly is aligned only slightly above the ring 70. The center of mass is placed above the ring 70, so as to slightly load the bearing 20 radially and thereby prevent flutter or oscillation in this bearing. As a result, substantially all centrifugal force developed in the roller assembly is applied to the ring 70 and there is only slight radial load on the bearing 20.

Since the centrifugal force of the roller is applied to the housing substantially below the center thereof, the lower end of the housing does the bulk of the work in vibrating the medium into which the vibrator is immersed. Thus, the lower portion of the vibrator tends to orbit around the geometric center of the housing, while the upper portion of the housing remains relatively stationary. As a result, the portion of the housing which orbits so as to displace the medium in which the vibrator operates presents a relatively small cross section to the medium and moves with relative ease.

This is to be contrasted with the condition that would obtain if the ring 70 were located at the center of the housing 10. Then, the entire housing would be urged to orbit in the medium in which the vibrator is to function and would present a relatively large cross section to the medium. The result would be a less vigorous vibration.

Location of the ring 70 to the lower end of the housing 10 offers the further benefit that the shaft 44 is elongated and its angle of pivoting movement in the housing 20 is reduced proportionately. This prolongs the life of the bearing. It is to be understood, of course, that the diameter of the orbit through which the roller 50 moves can be quite small, in that the vibrations obtained with the amplified speeds used in the present design are exceptionally effective and a large diameter orbital roller movement is not required.

It will be recognized by those skilled in the art that the method disclosed herein for frictionally adjusting the roller groove 52 to a rolling fit with the ring 70 offers a method of general application for grinding cylindrical surfaces to a precisely determined diameter. Thus, either the roller 50 or the ring 70 can be replaced by a cylindrical grinding element such that the opposite cylindrical surface is ground to a precise rolling fit with the grinding element. In such method, the grinding time is not critical, since the surface being round rolls with negligible friction after it has reached its proper diameter.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A vibrator for use in vibrating concrete, said vibrator including a housing having an axially extending cylindrical cavity, a bearing mounted in the upper end of the cylindrical cavity, a cylindrical roller mounted in the housing towards the lower end of the cylindrical cavity and spaced from the bearing, a ring gear mounted in the lower end of the cylindrical cavity, a pinion mounted on the lower end of said roller, said pinion and said ring gear having meshing teeth, means to hold the pinion in mesh with the ring gear, said roller having an annular groove near the middle thereof, a cylindrical ring fixedly attached to the housing and registering with the annular groove for engagement therewith, and driving means journalled in said bearing for rotating the cylindrical pendulum, said ring gear cooperating with said pinion to rotate the roller eccentrically with respect to the housing whereby rotation of said roller produces a centrifugal force transmitted to said housing through said cylindrical ring.

2. The vibrator according to claim 1, wherein said annular grove is cylindrical and wherein the ratio $d/D$, wherein $d$ is the diameter of said annular groove and $D$ is the interior diameter of said cylindrical ring, is not substantially less than the ratio $n/N$, wherein $n$ is the number of teeth in said pinion and $N$ is the number of teeth in said ring gear.

3. The vibrator according to claim 1, wherein the means to hold the pinion in mesh with the ring gear resides in the construction of the teeth of the pinion and ring gears, the teeth of said ring gear cooperating to interlock the teeth of said pinion engaged therewith.

4. A vibrator for use in vibrating concrete, said vibrator including a housing having an axially extending cylindrical cavity, a bearing mounted in the upper end of the cavity in the housing, a cylindrical roller mounted in the cavity of the housing toward the lower end thereof, a ring gear mounted in the housing adjacent the lower end of the roller, a pinion mounted on the lower end of the roller within said ring gear, said roller and said ring gear having meshing teeth, the teeth in said ring gear cooperating with the teeth in said pinion to hold the pinion in mesh with the ring gear, means mounted in the housing neaer the center of gravity of the roller against which the roller exerts its centrifugal force when rotated, and driving means journalled in said bearing for rotating the roller, the ring gear cooperating with said pinion to support the roller eccentrically with respect to the housing so as to produce an orbital movement of said roller and thereby vibrate the housing.

5. The vibrator according to claim 4, wherein the means mounted in the housing near the center of gravity of the roller against which the pendulum exerts its centrifugal force when rotated comprises a ring bearing having a cylindrical interior surface and wherein said ring bearing surrounds a cylindrical surface portion of said roller, the ratio $d/D$, wherein $d$ is the diameter of a surface portion of said roller surrounded by said ring bearing and $D$ is the diameter of the interior surface of said ring bearing, being not substantially less than the ratio $n/N$, wherein $n$ is the number of teeth in said pinion and $N$ is the number of teeth in said ring gear.

6. A device of the class described comprising a roller and a housing therefor, an annular ring having a substantially cylindrical interior surface, first means supporting said ring in said housing in surrounding relation to the roller, said roller having a substantially cylindrical exterior surface of diameter smaller than the diameter of the interior surface of said ring and adapted to roll thereon and thereby orbit about the axis of said interior surface, second means supporting said roller for rotation within said housing, means to impress on said roller a spin rotation relative to said housing and about the axis of said exterior cylindrical surface, and third means responsive solely to spin rotation of said roller to direct said roller through an orbital rotation about the axis of said interior ring surface in a direction opposite to that of said spin rotation, said third means comprising a pinion having externally directed circumferentially disposed teeth, means securing said pinion to said roller in coaxial relation to said external surface of said roller and restraining said pinion against rotation relative to said roller in the same direction as that of said spin rotation, a ring gear having internally directed circumferentially disposed teeth, and means supporting said ring gear in said housing in surrounding relation to said pinion and in coaxial relation to said interior surface of said ring and restraining said ring gear against rotation relative to said housing in the direction of said spin rotation, the teeth of said pinion engaging the teeth of said ring gear with lost rotary motion, the teeth of said ring gear being separated by valleys adapted to receive the teeth of said pinion and the teeth of said pinion being separated by valley adapted to receive the teeth of said ring gear, said first means restraining rotation of said ring in the same direction as the direction of the impressed spin rotation of said roller whereby said exterior surface engages and rolls upon said interior surface, the contact between said interior and exterior surfaces of said ring and roller respectively preventing bottoming of the teeth of said pinion into the valleys of said ring gear and preventing bottoming of the teeth of said ring gear into the valleys of said pinion, said directed orbital rotation having an angular velocity not substantially greater than the product of the angular velocity of said spin rotation and the ratio $d/D-d$ wherein $d$ is the diameter of said exterior surface of said roller and D is the diameter of said interior surface of said ring, the ratio $n/N$ wherein $n$ equals the number of teeth in said pinion and N equals the number of teeth in said ring gear being not substantially greater than the ratio $d/D$.

7. A device of the class described comprising a roller and a housing therefor, an annular ring having a substantially cylindrical interior surface, first means supporting said ring in said housing in surrounding relation to the roller, said roller having a substantially cylindrical exterior surface of diameter smaller than the diameter of the interior surface of said ring and adapted to roll thereon and thereby orbit about the axis of said interior surface, second means supporting said roller for rotation within said housing, means to impress on said roller a spin rotation relative to said housing and about the axis of said exterior cylindrical surface, third means responsive solely to spin rotation of said roller to direct said roller through an oribital rotation about the axis of said interior ring surface in a direction opposite to that of said spin rotation, said third means comprising a pinion having externally directed circumferentially disposed teeth, means securing said pinion to said roller in coaxial relation to said external surface of said roller and restraining said pinion against rotation relative to said roller in the same direction as that of said spin rotation, a ring gear having internally directed circumferentially disposed teeth, and means supporting said ring gear in said housing in surrounding relation to said pinion and in coaxial relation to said interior surface of said ring and restraining said ring gear against rotation relative to said housing in the direction of said spin rotation, said first means restraining rotation of said ring in the same direction as the direction of the impressed spin rotation of said roller whereby said exterior surface engages and rolls upon said interior surface, said directed orbital rotation having an angular velocity not substantially greater than the product of the angular velocity of said spin rotation and the ratio $d/D-d$ wherein $d$ is the diameter of said exterior surface of said roller and D is the diameter of said interior surface of said ring, the ratio $n/N$ wherein $n$ equals the number of teeth in said pinion and N equals the number of teeth in said ring gear being not substantially greater than the ratio $d/D$, said device including fourth means maintaining engagement between the teeth of said pinion and the teeth of said ring gear, said fourth means residing in the construction of the teeth of said pinion and ring gears, the teeth of said ring gear cooperating to interlock the teeth of said pinion engaged therewith.

References Cited by the Examiner

UNITED STATES PATENTS

| | | |
|---|---|---|
| 1,549,555 | 8/1925 | Jorgensen. |
| 2,167,987 | 8/1939 | Mall _____ 74—87 X |
| 2,198,148 | 4/1940 | Baily _____ 259—1 |
| 2,209,201 | 7/1940 | Hill _____ 74—805 |
| 2,290,541 | 7/1942 | Cramer _____ 51—26 |
| 2,437,983 | 3/1948 | Wenander _____ 259—1 |
| 2,546,806 | 3/1951 | Wenander _____ 74—87 |
| 2,704,911 | 3/1955 | Nylund _____ 51—26 |
| 2,844,041 | 7/1958 | Beijer et al. _____ 74—87 |
| 2,876,647 | 3/1959 | Petrin _____ 74—87 |
| 2,907,143 | 10/1959 | McNicoll _____ 51—26 X |
| 3,125,838 | 3/1964 | Crankshaw _____ 51—281 |
| 3,141,272 | 7/1964 | Horstman _____ 51—281 |

FOREIGN PATENTS 494,615   5/1954   Italy.

FRED C. MATTERN, Jr., *Primary Examiner.*

BROUGHTON G. DURHAM, MILTON KAUFMAN,
*Examiners.*

F. E. BAKER, *Assistant Examiner.*